United States Patent
Mangal

(10) Patent No.: US 8,306,882 B1
(45) Date of Patent: Nov. 6, 2012

(54) METHOD AND SYSTEM FOR DIFFERENTIAL BILLING BASED ON ACCESS SYSTEM

(75) Inventor: Manish Mangal, Overland Park, KS (US)

(73) Assignee: Sprint Spectrum L.P., Overland Park, KS (US)

(*) Notice: Subject to any disclaimer, the term of this patent is extended or adjusted under 35 U.S.C. 154(b) by 2680 days.

(21) Appl. No.: 10/304,475

(22) Filed: Nov. 25, 2002

(51) Int. Cl.
*G07F 19/00* (2006.01)

(52) U.S. Cl. ............. 705/34; 705/5; 705/26.2; 705/39; 705/40; 705/14.45; 705/52; 370/509; 370/449; 370/352; 370/466; 370/338; 370/252; 370/328; 370/503; 709/203; 709/238; 709/250; 709/220

(58) Field of Classification Search ............ 705/34
See application file for complete search history.

(56) References Cited

U.S. PATENT DOCUMENTS

| | | | | |
|---|---|---|---|---|
| 5,852,812 A | * | 12/1998 | Reeder | 705/39 |
| 6,189,042 B1 | * | 2/2001 | Keller-Tuberg | 709/238 |
| 6,421,714 B1 | * | 7/2002 | Rai et al. | 709/217 |
| 6,553,218 B1 | * | 4/2003 | Boesjes | 455/406 |
| 6,965,914 B2 | * | 11/2005 | Dowling | 709/203 |
| 7,272,128 B2 | | 9/2007 | Harris et al. | |
| 2002/0191572 A1 | * | 12/2002 | Weinstein et al. | 370/338 |
| 2003/0046396 A1 | * | 3/2003 | Richter et al. | 709/226 |
| 2003/0236745 A1 | * | 12/2003 | Hartsell et al. | 705/40 |

OTHER PUBLICATIONS

Sockeye Networks Raises the Bar for Accuracy in Route Optimization. May 22, 2002. PR Newswire, p. 1.*

* cited by examiner

*Primary Examiner* — F. Zeender
*Assistant Examiner* — Fawaad Haider

(57) ABSTRACT

A method and system for differential billing based on the access network through which data traffic flows between a subscriber and a service provider. The service provider may measure the amount of data traffic that flows to and from the subscriber and may determine which access network the traffic flows through on its way between the subscriber and the service provider. Based at least in part on the identity of the access network used, the service provider may determine a fee to charge the subscriber for handling the measured data flow.

4 Claims, 2 Drawing Sheets

METHOD AND SYSTEM FOR DIFFERENTIAL BILLING BASED ON ACCESS SYSTEM

BACKGROUND

1. Field of the Invention

The present invention relates to communication networks and, more particularly, to mechanisms for determining how much to bill subscribers for communication services.

2. Description of Related Art

Recent growth in the telecommunications industry has ushered in a new era of convenience and productivity. With the widespread availability of wireless and Internet communications, the current thought is that a coappltymmunication service provider (e.g., a telephony carrier and/or Internet service provider) will serve subscribers who gain access to the service provider through any of a variety of different access networks. For example, a service provider might allow subscribers to communicate with or through the service provider via access networks such as (i) a dial-up landline telephone connection, (ii) a cellular (e.g., CDMA, TDMA or GSM) radio access network, (iii) a wired LAN, and (iv) a wireless LAN (WLAN). Further, the service provider might enable a subscriber to seamlessly roam between these various access networks while maintaining a connection or communication path with or through the service provider.

It is also commonplace for a service provider to charge a subscriber for service based on the quantity of data communicated to and from the subscriber and/or based on the quality of communications to and from the subscriber.

SUMMARY

In accordance with an exemplary embodiment of the invention, a service provider will identify the access system through which a given subscriber gains access to the service provider (for communication with the service provider, or for communication through the service provider), and the service provider will then charge the subscriber for communication services based at least in part on that access network. Thus, for instance, if a subscriber gains access to an ISP through a CDMA access network, the ISP might charge the subscriber a certain service fee per bit communicated, and if the subscriber gains access to the ISP via a WLAN access network, the ISP might charge the subscriber a different service fee per bit communicated.

Thus, in one respect, an exemplary embodiment may take the form of a differential billing method that includes the functions of (i) determining which of a plurality of access systems data traffic flows through between a subscriber and a service provider and (ii) using the access system as a basis to determine a fee that the service provider should charge the subscriber.

And in another respect, the exemplary embodiment may take the form of a differential billing method that includes the functions of (i) a service provider operating a system to calculate a fee that the service provider should charge a subscriber for carrying data traffic for the subscriber and (ii) the service provider varying the fee based at least in part on which of multiple access systems the data traffic flows through between the subscriber and the service provider.

In still another respect, the exemplary embodiment may take the form of a system that includes (i) a data-traffic measuring system that measures how much data traffic flows between a subscriber and a service provider, (ii) means for identifying an access system through which the data traffic flows between the subscriber and the service provider, and (iii) a billing system that calculates a fee that the service provider should charge the subscriber for handling the data traffic, where the fee is based at least in part on the identified access system.

And in yet another respect, an exemplary embodiment may take the form of a billing differentiator that includes, in one or more entities (i) a processor (i.e., one or more processors), (ii) data storage (e.g., volatile and/or non-volatile) and (iii) program instructions stored in the data storage and executable by the processor to vary a fee to be charged to a subscriber for data communication based at least in part on which of a plurality of access systems the data communication flows through.

These and other aspects and advantages will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which.

DETAILED DESCRIPTION OF AN EXEMPLARY EMBODIMENT

1. Overview

Figure 1:
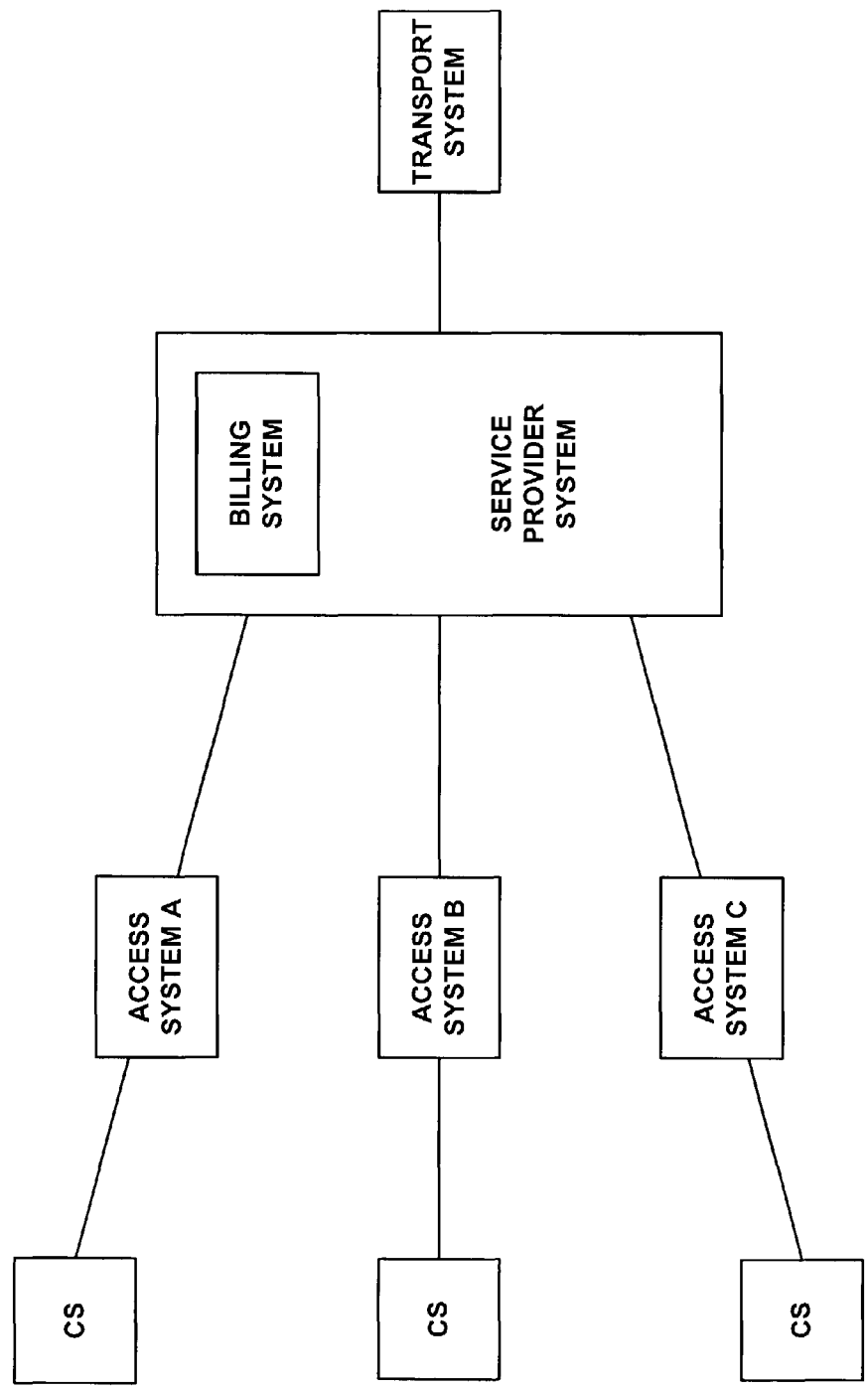
FIG. 1 is a simplified block diagram of a communication system in which the exemplary embodiment can be implemented.

FIG. 1 is a generalized block diagram of a communication system in which an exemplary embodiment of the invention can be employed. The communication system includes a service provider system and a plurality of access systems, shown by way of example as access system A, access system B and access system C.

A subscriber's client station (CS) with connectivity to a given access system can engage in data communication to or through the service provider system via the given access system. The service provider system may provide connectivity with a transport system, so that the client station can communicate through the given access system and the service provider system with an entity on the transport system. Or the client station might simply communicate through the given access system with the service provider system.

Further, the service provider system preferably includes or is linked with a billing system, which functions to compile information to facilitate charging subscribers for use of the service provider system. In this regard, the service provider system may count the quantity of data that the service provider receives from or passes to the subscriber's client station and may report that quantity to the billing system. The billing system may then multiple the quantity of data by a predefined billing rate to establish a charge against the subscriber's account. The service provider might then bill or debit the subscriber accordingly.

In accordance with the exemplary embodiment, the service provider system will vary the fees that it charges a subscriber for data communications based at least in part on the access system that the subscriber through which the subscriber gains access to the service provider. Thus, in FIG. 1, for instance, the service provider might apply billing rate A for data communications through access system A, billing rate B for data communications through access system B, and billing rate C for data communications through access system C.

The service provider can differentiate between access systems, so as to facilitate differential billing according to the exemplary embodiment, in any of a variety ways, details of which are not necessarily critical. By way of example, each access network could be tied to a respective port or other entity at the service provider system, so the service provider system would necessarily know that any data traffic flowing through that port or entity relates to that access network. And as another example, traffic that flows through a given access network could bear an access system identifier, and the service provider system could read that access system identifier to determine the access system being used. Further, it is possible that the service provider might identify some access systems in one manner and other access systems in another manner.

2. Exemplary Architecture

Figure 2:
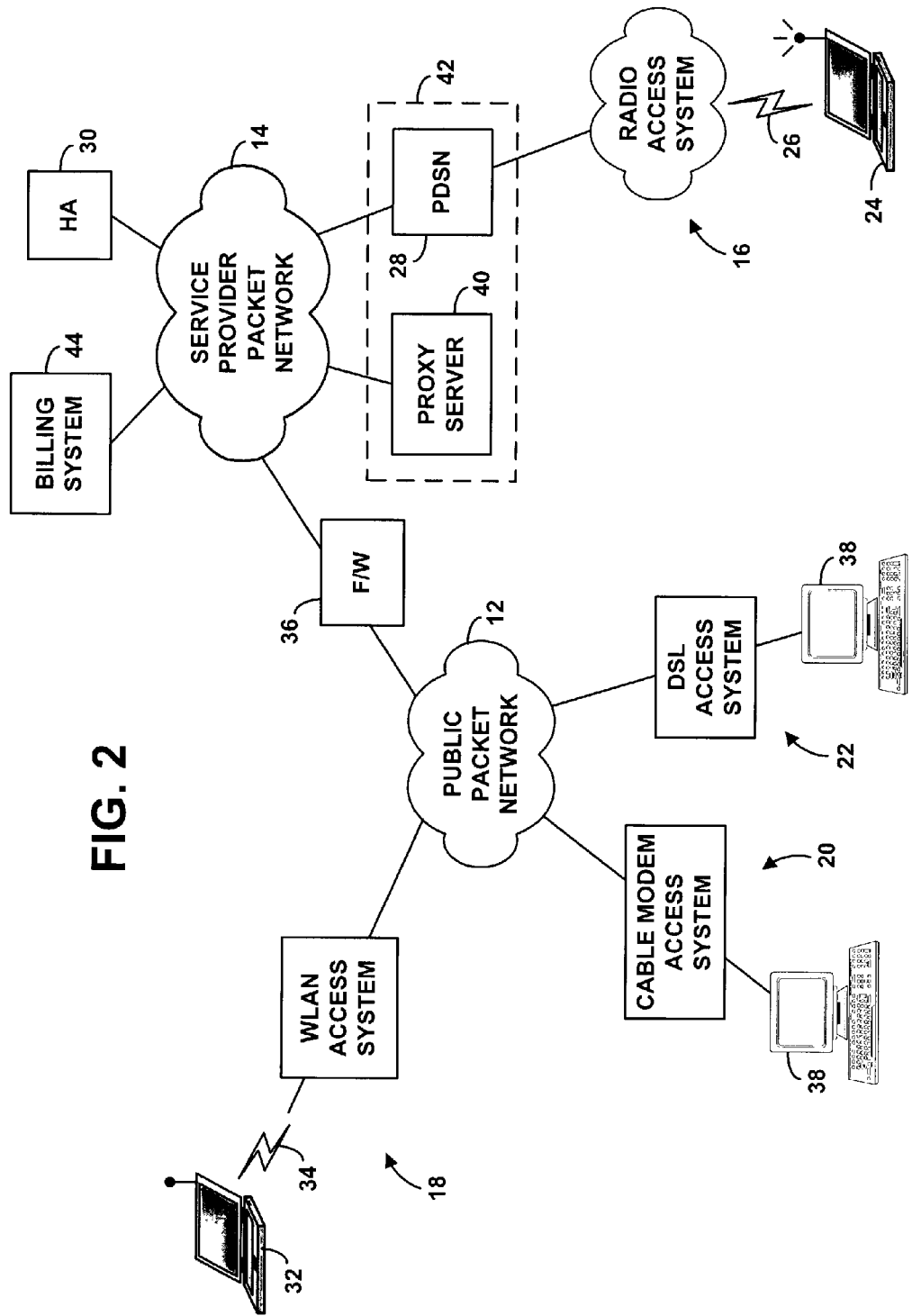
FIG. 2 is a more detailed block diagram of a communication system in which the exemplary embodiment can be implemented.

FIG. 2 is a block diagram of a more specific communication system, to help further illustrate how the exemplary embodiment could be implemented. It should be understood, however, that this and other arrangements described herein are set forth for purposes of example only. As such, those skilled in the art will appreciate that other arrangements and other elements (e.g., machines, interfaces, functions, orders of functions, etc.) can be used instead, and some elements may be omitted altogether. Further, many of the elements described herein are functional entities that may be implemented as discrete or distributed components or in conjunction with other components, and in any suitable combination and location.

Additionally, various functions described herein as being performed by one or more entities may be carried out by hardware, firmware and/or software logic. For instance, various functions may be carried out by a processor (i.e., one or more processors) executing a set of machine language instructions stored in memory. Provided with the present disclosure, those skilled in the art can readily prepare appropriate computer instructions to perform such functions.

The system shown in FIG. 2 includes a public packet network 12 (such as the Internet for instance) and a service provider packet network 14 (such as an IP or ATM network that might be operated by a carrier like Sprint Corporation for instance.) In this arrangement, the service provider packet network 14 might constitute the service provider system of FIG. 1, and the public packet network 12 might constitute the transport system of FIG. 1.

FIG. 2 depicts several access systems by way of example, although it should be understood that more, fewer or different access systems could be included. In particular, FIG. 2 depicts (i) a 3G cellular radio access system 16, (ii) a wireless LAN access system 18, (iii) a cable modem access system 20, and (iv) a DSL access system 22. Each of these access systems supplies connectivity between a client station (one or more) and the service provider packet network, through one or more intermediate networks or links.

The 3G cellular radio access system, for instance, connects a 3G mobile station 24 with the service provider packet network. Under current industry recommendations, the 3G radio access system would include a base station (not shown) that radiates to establish an air interface 26 for communicating with the mobile station. And the base station would then be linked with a packet data serving node (PDSN) 28 that the service provider operates as a network access server to provide connectivity with a packet-switched network. Thus as shown in FIG. 2, the PDSN 28 can sit as a node on the service provider's packet network.

In this arrangement, the 3G mobile station 24 could be programmed to acquire a data link (e.g., point to point protocol link) with the PDSN 28 and to register with a mobile-IP home agent (HA) 30 or other such entity on the service provider's packet network 14 so as to acquire a mobile-IP address for communicating with entities on the service provider's packet network 14 and/or with entities on the public packet network 12.

Thus, packet data communications from the 3G mobile station 24 to an entity on the service provider's network 14 or on the public packet network 12 can flow through the radio access system 16 and PDSN 28, through the service provider's packet network 14 to the home agent 30 and then on to the destination entity. And packet data communications to the 3G mobile station 24 from an entity on the service provider's network 14 or on the public packet network 12 would flow through service provider's packet network 14 to the home agent 30 and then along to the PDSN 28 and through the radio access system 16 to the 3G mobile station 24.

The WLAN access system 18 is somewhat similar to the 3G radio access system 16, the most significant difference being that it is not normally linked directly with a service provider's PDSN 28 but rather (typically, albeit not necessarily) provides access through the public packet network 12. Conventionally, the WLAN access system 18 would comprise a wireless access point (not shown) that communicates over an air interface 34 with WLAN stations (e.g. 802.11b or 802.11a stations), an example 32 of which is shown, and that is linked with a local distribution system (not shown) such as a wired LAN providing connectivity with the public packet network 12. Typically, the wireless access point and/or distribution system would include a router or other such device (not shown) to facilitate routing traffic in the distribution system and between the distribution system and the public packet network. The public packet network 12 may then be linked through a firewall 36 with the service provider's packet network 14.

If the operator of the WLAN station 32 subscribes to service supplied by the service provider, then the WLAN station 32 could be programmed, much like the 3G mobile station 24, to register with the service provider's home agent 30 so as to acquire a mobile-IP address for communicating with entities on the provider's packet network 14 and/or with entities on the public packet network 12. (In this regard, the WLAN station 32 could in fact be the 3G mobile station 24, as a dual mode device capable of operating and roaming between the 3G access system 16 and the WLAN access system 18.) Alternatively, the WLAN station 32 could otherwise acquire an IP address.

With this arrangement, packet data communications from the WLAN station 32 to an entity on the service provider's network 14 or on the public packet network 12 could flow through the WLAN access system 18 and public packet network 12 to the service provider's packet network 14, and then through the home agent 30 to the destination entity. And packet data communications to the WLAN station 32 from an entity on the service provider's network 14 or on the public packet network 12 could flow through the home agent 30 and service provider's network 14 out onto the public packet network 12 and then through the WLAN access system 18 to the WLAN station 32.

The cable modem access system 20 and DSL access system 22 both typically function to supply packet data connectivity for a personal computer 38 or other computing device equipped with an appropriate modem (e.g., cable modem or DSL modem). In an exemplary cable modem arrangement, a cable modem (not shown) would be linked via coaxial cable with a cable modem termination system (CMTS), which would then provide connectivity with the public packet network. And in an exemplary DSL arrangement, a DSL modem (not shown) would be linked by telephone lines to a telephone company central office, which would then provide connectivity with the public packet network 12.

If the operator of the of the personal computer 38 subscribes to the service provider's service, then, like a WLAN station 32, the personal computer 38 could be programmed to register with the service provider's mobile-IP home agent 30 so as to acquire a mobile-IP address. Alternatively, the personal computer 38 could acquire an IP address in some other way.

With this arrangement, packet data communications from the personal computer 38 to an entity on the service provider's network 14 or on the public packet network 12 could flow through the CMTS or central office on to the public packet network 12 and the service provider's packet network 14, and then through the home agent 30 to a destination entity. And packet data communications can flow from an originating entity through the service provider's network 14 and home agent 30, then via the public packet network 12 and CMTS or central office along to the personal computer 38.

3. Measuring Data Traffic

A service provider preferably employs a system of some sort to measure the amount of data traffic that the service provider handles (e.g., carries) for a given subscriber and to report the measurement to a back-end billing system, so as to facilitate billing the subscriber for handling the traffic. The system for measuring the amount of data flow may take any of a variety of forms, possibly varying depending on the manner in which the service provider handles the data flow.

Clearly, an entity that measures of the amount of data traffic that flows to or from a given subscriber should be an entity that is aware of the data traffic flow. In the arrangement of FIG. 2, for instance, that entity could be the mobile-IP home agent 30. However, using the mobile-IP home agent 30 to measure the amount of data flowing to and from a subscriber could be problematic in some instances. One problem with doing so is that it is unconventional; home agents are not typically arranged to do so. Another problem with doing so is that, in some mobile-IP arrangements, outbound traffic (that is, traffic flowing from the client station to a destination entity) does not flow through the home agent, but only inbound traffic (flowing to the client station) does. Consequently, in those arrangements, the home agent 30 would be unable to measure the amount of data that flows from the mobile-IP client.

Thus, instead of employing the home agent 30 to measure the amount of data flow, one or more other entities in the data path could be arranged to measure of the amount of data flow.

With a 3G access system 16 as shown in FIG. 2, the PDSN 28 is ideally situated to measure the amount of data that flows to and from a given 3G mobile station 24, since the PDSN 28 necessarily (under current recommendations, albeit subject to change) sits within the mobile station's access channel. Thus, the service provider could conventionally program the PDSN 28 to measure how much data flows to and from a given 3G mobile station 24. Alternatively, some other entity in the access channel, such as a base station for instance, could be arranged to do so.

In contrast, with the other access systems 18, 20 and 22 shown by way of example in FIG. 2, traffic does not conventionally flow through a service provider's PDSN 28. So some other mechanism could be employed to measure the traffic flow to and from client stations operating via those other access systems.

In accordance with the exemplary embodiment, for instance, the service provider could operate a proxy server 40 on its packet network. And each client station served by the service provider could be programmed to direct packet data traffic through the proxy server 40. That way, data traffic to and from the client station could be made to flow through the proxy server 40, whether or not it also flows through the service provider's home agent 30. And the proxy server 40 could conveniently measure the traffic flow, just as the PDSN 28 could do. In fact, the proxy server 40 could be integrated with the PDSN 28, as a function of the PDSN 28 for instance (as illustrated by the dashed box 42 in FIG. 2.) Other mechanisms for measuring the flow of data traffic per subscriber are possible as well.

4. Distinguishing Data Traffic Based on Access System

In accordance with the exemplary embodiment, the service provider can bill a subscriber differently based at least in part on the access system that the subscriber uses in a given instance. To facilitate this, some mechanism should be provided to enable the service provider to determine the access system through which data traffic flows to or from a given client station. As noted above, this mechanism can take various forms.

In an exemplary embodiment, for instance, data traffic that flows to and from a given client station can contain an access system identifier. And when the service provider measures the amount of data traffic flow for a given subscriber, the service provider could read the access system identifier to determine which access system is being used. The service provider could then apply a billing rate that is based at least in part on the access system. (The billing rate could be based on other factors as well, such as the subscriber's contracted level of service, the time of day, and so forth.)

The manner in which data traffic can be labeled with an access system identifier can take various forms. For example, for traffic flowing outbound from a client station, the client station could insert an access system identifier (e.g., a predefined code) into each packet header or into some other predefined position in each packet (or some packets). Preferably, the client station would be programmed with logic that causes the client station to insert the correct access system identifier. For instance, a dual mode 3G/802.11 station might switch between transceivers when it switches between the 3G access system 16 and the WLAN access system 18 and might therefore insert a particular access system identifier depending on which transceiver it is using at the time. And a personal computer 38 using a cable modem or DSL access system might be programmed with a network setting that indicates the access system it is using and might therefore insert an access system identifier based on that setting. Alternatively, the access system itself (or some other entity with knowledge of which access system is being used) could insert an access system identifier into the outbound traffic.

Similarly, for traffic flowing inbound to a client station, the service provider's home agent 30 (or some other such entity) could insert an access system identifier in the traffic, again in some predefined position. In this regard, in a mobile-IP system, a client station conventionally registers with the home agent, giving the home agent an indication of a foreign agent that currently serves the client station. In the access systems shown in FIG. 2, the foreign agent would be an access system entity, such as a PDSN, a WLAN access point or distribution system router/server, a cable modem termination system, or a DSL termination system in a central office. (Other examples are also possible). Thus, the home agent 30 would have a record of the access system in which a given subscriber is operating, so the home agent 30 can insert an access system identifier into traffic flowing (e.g., via the PDSN 28 or proxy server 40) to the client station.

In this manner, traffic flowing to and from the client station would include an access system identifier, and the service provider entity that measures the traffic could read the identifier. For instance, as the PDSN 28 passes data traffic to or from a 3G mobile station 24, the PDSN 28 might read each packet header to determine (i) the packet length and (ii) the access system identifier. And the PDSN could then (or later) pass on to the billing system an indication of the amount of data and the access system that the 3G mobile station 24 used. Similarly, the proxy server 40 could perform the same function for traffic flowing to or from a WLAN station 32 or a personal computer 38 in the other access systems shown in FIG. 2.

In the exemplary embodiment, the access system identifier can identify a type of access system generally, such as 3G radio access system, WLAN access system, cable modem access system or DSL access system. Alternatively or additionally, the access system identifier could identify a specific access system, such as by indicating a particular access system owner or operator for instance. The access system identifier could take still other forms and levels of granularity as well.

Another way to differentiate between access systems, as noted above, is based on the manner in which traffic flows between the access system and the service provider. For instance, in the exemplary arrangement of FIG. 2, all 3G traffic flows through a PDSN 28. Therefore, it is clear that the traffic flow measured by the PDSN flows through the 3G access system 16. In an exemplary embodiment, similar systems could be put in place for traffic flowing through other access systems. For instance, instead of having a single proxy server function to measure data traffic flowing through multiple other access systems, the service provider could operate separate proxy servers, one for each access system or for each class or category of access system (e.g., one for WLAN traffic, one for cable modem traffic, and one for DSL traffic, and so forth). That way, the fact that traffic flows through a given proxy server could itself reflect use of a given access system.

5. Differential Billing Based on Access System

In accordance with the exemplary embodiment, the service provider's billing system preferably receives measures of data flow per subscriber (e.g., per client station or per subscriber account), with an indication of access system used for the data flow. Thus, in the arrangement of FIG. 2, for instance, a billing system 44 may receive from the PDSN 28 and/or proxy server 40 a report (or multiple reports) that a given subscriber has communicated a certain amount of data traffic through a 3G access system 16, that the given subscriber has communicated another amount of data traffic through a WLAN access system 18, and that the given subscriber communicated yet another amount of data traffic through a cable modem access system 20.

The billing system 44 will then use the identity of the access system as a basis to charge the subscriber for the communications. For instance, a billing server (not shown) may programmatically apply one billing rate for communications through 3G access systems, another billing rate for communications through WLAN access systems, and another billing rate for communications through cable modem access systems. Applying those different rates to the different measures of traffic flow for the given subscriber, the billing server may establish a total fee for the subscriber. And the billing system may then generate a bill to the subscriber or debit a subscriber account for the fee.

In an exemplary embodiment, for instance, the billing system 44 could regularly receive measures of data traffic and debit a subscriber account balance, to facilitate a prepaid communication service or the like. Further, the service provider could bill the subscriber for the communication service indirectly by passing the charges along to an access system provider who can pay the service provider and bill the subscriber.

6. Conclusion

An exemplary embodiment of the present invention has been described above. Those skilled in the art will understand, however, that changes and modifications may be made to this embodiment without departing from the true scope and spirit of the present invention, which is defined by the claims.

I claim:

1. A differential billing method comprising:
   determining which of a plurality of access systems data traffic flows through between a subscriber and a service provider, wherein the service provider operates a plurality of servers through which traffic flows to and from access systems, including a first server through which traffic flows to and from a first access system, and a second server through which traffic flows to and from a second access system, and wherein determining which of a plurality of access systems data traffic flows through between a subscriber and a service provider comprises determining which server, of the plurality of servers, through which the data traffic flows;
   using an identity of the determined access system as a basis to determine a fee that the service provider should charge the subscriber, wherein using the identity of the determined access system as the basis to determine the fee that the service provider should charge the subscriber comprises a billing system processor applying a billing rate corresponding with the determined access system so as to determine the fee; and
   charging the determined fee to the subscriber.

2. The differential billing method of claim 1, wherein the first server is a PDSN and the second server is a proxy server.

3. The differential billing method of claim 1, wherein using the identity of the determined access system as a basis to determine a fee that the service provider should charge the subscriber comprises:
   selecting a billing rate based at least in part on the identity of the determined access system; and
   applying the billing rate to a measure of data traffic that flows between the subscriber and the service provider.

4. The differential billing method of claim 1, wherein the plurality of access systems includes at least one of a cellular radio access system, a wireless LAN access system, a cable modem access system and a DSL access system.

* * * * *